United States Patent
Kim et al.

(10) Patent No.: US 10,838,418 B2
(45) Date of Patent: Nov. 17, 2020

(54) METHOD FOR PROVIDING AUTONOMOUS DRIVING SERVICE PLATFORM TO BE USED FOR SUPPORTING AUTONOMOUS DRIVING OF VEHICLES BY USING COMPETITIVE COMPUTING AND INFORMATION FUSION, AND SERVER USING THE SAME

(71) Applicant: StradVision, Inc., Gyeongsangbuk-do (KR)

(72) Inventors: Kye-Hyeon Kim, Seoul (KR); Yongjoong Kim, Gyeongsangbuk-do (KR); Hak-Kyoung Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Dongsoo Shin, Gyeonggi-do (KR); Donghun Yeo, Gyeongsangbuk-do (KR); Wooju Ryu, Gyeongsangbuk-do (KR); Myeong-Chun Lee, Gyeongsangbuk-do (KR); Hyungsoo Lee, Seoul (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-do (KR)

(*) Notice: Subject to any disclaimer, the term of this patent is extended or adjusted under 35 U.S.C. 154(b) by 0 days.

(21) Appl. No.: 16/738,427

(22) Filed: Jan. 9, 2020

(65) Prior Publication Data
US 2020/0249676 A1    Aug. 6, 2020

Related U.S. Application Data

(60) Provisional application No. 62/799,131, filed on Jan. 31, 2019.

(51) Int. Cl.
*G08G 1/017* (2006.01)
*G05D 1/00* (2006.01)
(Continued)

(52) U.S. Cl.
CPC ......... *G05D 1/0088* (2013.01); *G05D 1/0221* (2013.01); *G06N 3/08* (2013.01); *G05D 2201/0213* (2013.01)

(58) Field of Classification Search
CPC .. G05D 1/0088; G05D 1/0011; G05D 1/0221; G05D 2201/0213; G08G 1/017;
(Continued)

(56) References Cited

U.S. PATENT DOCUMENTS 10,019,011 B1 * 7/2018 Green ................. G05D 1/0223
2015/0158499 A1   6/2015 Koravadi
(Continued)

FOREIGN PATENT DOCUMENTS

EP    3309640 A2   4/2018
WO   2018122808 A1   7/2018

*Primary Examiner* — Dalena Tran
(74) *Attorney, Agent, or Firm* — Husch Blackwell LLP

(57) ABSTRACT

A method for providing an autonomous driving service platform for autonomous vehicles by using a competitive computing and information fusion is provided. And the method includes steps of: (a) a service server acquiring individual sensor data and individual driving data through sensors installed on at least part of the autonomous vehicles including a subject vehicle; (b) the service server performing (i) a process of acquiring autonomous driving source information for the subject vehicle by inputting specific sensor data of specific autonomous vehicles among the autonomous
(Continued)

vehicles and subject sensor data of the subject vehicle to data processing servers and (ii) a process of acquiring circumstance-specific performance information on the data processing servers from a circumstance-specific performance DB; and (c) the service server transmitting the autonomous driving source information and the circumstance-specific performance information to the subject vehicle, to thereby instruct the subject vehicle to perform the autonomous driving.

18 Claims, 3 Drawing Sheets

(51) Int. Cl.
      *G06N 3/08*           (2006.01)
      *G05D 1/02*           (2020.01)

(58) Field of Classification Search
      CPC ...... G08G 1/0145; H04W 4/024; H04W 4/38; H04W 4/44
      USPC ..... 701/27, 118, 119, 484; 340/995.13, 988, 340/539.13, 905; 455/456.3
      See application file for complete search history.

(56) References Cited

U.S. PATENT DOCUMENTS

| | | | |
|---|---|---|---|
| 2019/0034798 A1* | 1/2019 | Yu | .......................... G06N 3/063 |
| 2019/0049950 A1* | 2/2019 | Poornachandran | .. G05D 1/0088 |

* cited by examiner

METHOD FOR PROVIDING AUTONOMOUS DRIVING SERVICE PLATFORM TO BE USED FOR SUPPORTING AUTONOMOUS DRIVING OF VEHICLES BY USING COMPETITIVE COMPUTING AND INFORMATION FUSION, AND SERVER USING THE SAME

CROSS REFERENCE OF RELATED APPLICATION

This present application claims the benefit of the earlier filing date of provisional patent application No. 62/799,131, filed Jan. 31, 2019, the entire contents of which being incorporated herein by reference.

FIELD OF THE DISCLOSURE

The present disclosure relates to a method and a server to be used for autonomous driving; and more particularly, to the method for providing an autonomous driving service platform to be used for supporting an autonomous driving of vehicles by using competitive computing and an information fusion, and the server using the same.

BACKGROUND OF THE DISCLOSURE

Autonomous vehicles use various computing systems to aid in transport of passengers from one location to another. Some autonomous vehicles may require some initial input or continuous input from an operator, such as a pilot, driver, or passenger. Other systems, for example, autopilot systems, may be used only when the system has been engaged, which permits the operator to switch from a manual driving mode (where the operator exercises a high degree of control over a movement of the vehicle) to an autonomous driving mode (where the vehicle essentially drives itself).

Such vehicles are typically equipped with various types of sensors in order to detect objects in the environment. For example, autonomous vehicles may include LIDARs, sonar, radar, cameras, and other devices which scan and record data from the vehicle's environment. Sensor data from one or more of these devices may be used to detect objects and their respective characteristics (position, shape, heading, speed, etc.).

However, conventional autonomous driving vehicles perform autonomous driving according to their own autonomous driving algorithms based on a deep learning, and accordingly different results are derived from different autonomous driving algorithms even in the same driving environment, and as a result stability of the autonomous driving cannot be guaranteed.

Therefore, the inventors of the present disclosure propose a method for improving an accuracy and a stability of an autonomous driving algorithm.

SUMMARY OF THE DISCLOSURE

It is an object of the present disclosure to solve all the aforementioned problems.

It is another object of the present disclosure to improve an accuracy and a stability of at least one autonomous driving algorithm.

It is still another object of the present disclosure to allow at least one autonomous vehicle to perform autonomous driving according to autonomous driving source information with a sufficient credibility.

It is still yet another object of the present disclosure to allow safe autonomous driving by using nearby sensor data of one or more nearby autonomous vehicles.

In accordance with one aspect of the present disclosure, there is provided a method for providing an autonomous driving service platform to be used for supporting an autonomous driving of autonomous vehicles by using a competitive computing and information fusion, including steps of: (a) a service server acquiring individual sensor data and individual driving data through sensors installed on at least part of the autonomous vehicles including a subject vehicle; (b) the service server performing (i) a process of acquiring each of pieces of autonomous driving source information for the subject vehicle by inputting specific sensor data of one or more specific autonomous vehicles among the autonomous vehicles other than the subject vehicle and subject sensor data of the subject vehicle to each of one or more data processing servers and (ii) a process of acquiring circumstance-specific performance information on the data processing servers from a circumstance-specific performance DB by referring to subject driving data of the subject vehicle; and (c) the service server transmitting the autonomous driving source information and the circumstance-specific performance information to the subject vehicle, to thereby instruct the subject vehicle to perform the autonomous driving by referring to the autonomous driving source information and the circumstance-specific performance information.

As one example, at the step of (b), the service server acquires at least part of topographic information around the subject vehicle, climate information thereround, driving timing information of the subject vehicle, and vehicle type information thereof by referring to the subject driving data, and transmits a query to the circumstance-specific performance DB by referring to said at least part of the topographic information, the climate information, the driving timing information and the vehicle type information, to thereby acquire the circumstance-specific performance information of the data processing servers.

As one example, at the step of (c), the service server instructs the subject vehicle (i) to calculate each of self-verification scores on each of the pieces of the autonomous driving source information by referring to the subject sensor data, (ii) to generate integrated autonomous driving source information corresponding to each of the pieces of the autonomous driving source information by referring to at least part of the self-verification scores and the circumstance-specific performance information, (iii) to perform the autonomous driving by referring to the integrated autonomous driving source information.

As one example, the service server instructs at least one Convolutional Neural Network (CNN) included in the subject vehicle to apply at least one CNN operation to a vector including (i) the subject sensor data and (ii) the autonomous driving source information to perform a classification, to thereby generate the self-verification scores.

As one example, the service server instructs the subject vehicle to deliver the self-verification scores to the service server as performance feedback information, and updates the circumstance-specific performance DB by referring to the performance feedback information.

As one example, the service server instructs the subject vehicle (i) to perform the autonomous driving by referring to integrated autonomous driving source information generated by using each of the pieces of the autonomous driving source information and the circumstance-specific performance information at a T-th timing, (ii) to calculate each of self-verification scores on each of the pieces of the autonomous driving source information by using resultant circumstance information at a (T+1)-th timing according to the autonomous driving performed at the T-th timing, and (iii) to deliver the self-verification scores to the service server as performance feedback information.

As one example, at the step of (b), the service server selects the specific autonomous vehicles, among the autonomous vehicles, which satisfy at least one of a direct interaction condition corresponding to a relationship between a subject location of the subject vehicle and one or more individual locations of the autonomous vehicles and an indirect interaction condition corresponding to individual motion information of the autonomous vehicles.

As one example, each of the data processing servers generates each of the pieces of the autonomous driving source information by applying its autonomous driving algorithms to the subject sensor data and the specific sensor data, wherein the autonomous driving algorithms are built by using at least part of a rule-based algorithm and a deep learning algorithm, and each of the data processing servers is operated by each of different entities so that their autonomous driving algorithms are different from each other.

As one example, each of one or more specific data processing servers using each of one or more specific autonomous driving algorithms built based on the deep learning algorithm applies a convolutional operation using its own convolutional layer to the subject sensor data and the specific sensor data to generate at least one feature map, and applies an output operation using its own output layer to the feature map, to thereby generate each of the pieces of the autonomous driving source information.

In accordance with another aspect of the present disclosure, there is provided a service server for providing an autonomous driving service platform to be used for supporting an autonomous driving of autonomous vehicles by using a competitive computing and information fusion, including: at least one memory that stores instructions; and at least one processor configured to execute the instructions to perform processes of: (I) acquiring individual sensor data and individual driving data through sensors installed on at least part of the autonomous vehicles including a subject vehicle; (II) (i) a process of acquiring each of pieces of autonomous driving source information for the subject vehicle by inputting specific sensor data of one or more specific autonomous vehicles among the autonomous vehicles other than the subject vehicle and subject sensor data of the subject vehicle to each of one or more data processing servers and (ii) a process of acquiring circumstance-specific performance information on the data processing servers from a circumstance-specific performance DB by referring to subject driving data of the subject vehicle; and (III) transmitting the autonomous driving source information and the circumstance-specific performance information to the subject vehicle, to thereby instruct the subject vehicle to perform the autonomous driving by referring to the autonomous driving source information and the circumstance-specific performance information.

As one example, at the process of (II), the processor acquires at least part of topographic information around the subject vehicle, climate information therearound, driving timing information of the subject vehicle, and vehicle type information thereof by referring to the subject driving data, and transmits a query to the circumstance-specific performance DB by referring to said at least part of the topographic information, the climate information, the driving timing information and the vehicle type information, to thereby acquire the circumstance-specific performance information of the data processing servers.

As one example, at the process of (III), the processor instructs the subject vehicle (i) to calculate each of self-verification scores on each of the pieces of the autonomous driving source information by referring to the subject sensor data, (ii) to generate integrated autonomous driving source information corresponding to each of the pieces of the autonomous driving source information by referring to at least part of the self-verification scores and the circumstance-specific performance information, (iii) to perform the autonomous driving by referring to the integrated autonomous driving source information.

As one example, the processor instructs at least one Convolutional Neural Network (CNN) included in the subject vehicle to apply at least one CNN operation to a vector including (i) the subject sensor data and (ii) the autonomous driving source information to perform a classification, to thereby generate the self-verification scores.

As one example, the processor instructs the subject vehicle to deliver the self-verification scores to the service server as performance feedback information, and updates the circumstance-specific performance DB by referring to the performance feedback information.

As one example, the processor instructs the subject vehicle (i) to perform the autonomous driving by referring to integrated autonomous driving source information generated by using each of the pieces of the autonomous driving source information and the circumstance-specific performance information at a T-th timing, (ii) to calculate each of self-verification scores on each of the pieces of the autonomous driving source information by using resultant circumstance information at a (T+1)-th timing according to the autonomous driving performed at the T-th timing, and (iii) to deliver the self-verification scores to the service server as performance feedback information.

As one example, at the process of (II), the processor selects the specific autonomous vehicles, among the autonomous vehicles, which satisfy at least one of a direct interaction condition corresponding to a relationship between a subject location of the subject vehicle and one or more individual locations of the autonomous vehicles and an indirect interaction condition corresponding to individual motion information of the autonomous vehicles.

As one example, each of the data processing servers generates each of the pieces of the autonomous driving source information by applying its autonomous driving algorithms to the subject sensor data and the specific sensor data, wherein the autonomous driving algorithms are built by using at least part of a rule-based algorithm and a deep learning algorithm, and each of the data processing servers are operated by each of different entities so that their autonomous driving algorithms are different from each other.

As one example, each of one or more specific data processing servers using each of one or more specific autonomous driving algorithms built based on the deep learning algorithm applies a convolutional operation using its own convolutional layer to the subject sensor data and the specific sensor data to generate at least one feature map, and applies an output operation using its own output layer to the feature map, to thereby generate each of the pieces of the autonomous driving source information.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
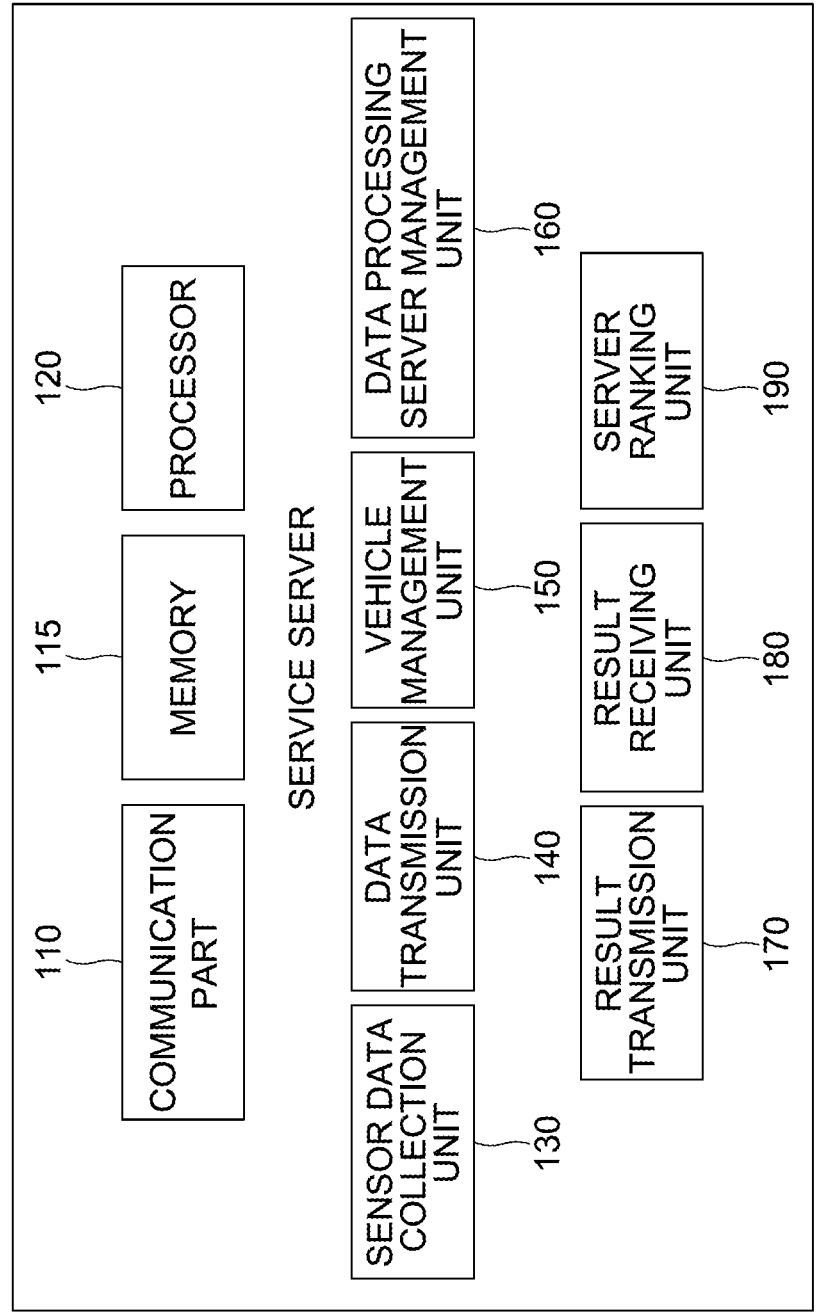
FIG. 1 is a drawing schematically illustrating a configuration of a service server for providing an autonomous driving service platform to be used for supporting an autonomous driving of autonomous vehicles by using a competitive computing and an information fusion in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

FIG. 1 is a drawing schematically illustrating a configuration of a service server for providing an autonomous driving service platform to be used for supporting an autonomous driving of autonomous vehicles by using a competitive computing and an information fusion in accordance with one example embodiment of the present disclosure.

By referring to FIG. 1, the service server 100 may include a sensor data collection unit 130, a data transmission unit 140, a vehicle management unit 150, a data processing server management unit 160, a result transmission unit 170, a result receiving unit 180 and a server ranking unit 190 to be described later. Herein, processes of input/output and computations of the sensor data collection unit 130, the data transmission unit 140, the vehicle management unit 150, the data processing server management unit 160, the result transmission unit 170, the result receiving unit 180 and the server ranking unit 190 may be respectively performed by at least one communication part 110 and at least one processor 120. However, detailed communication schematics between the communication part 110 and the processor 120 are omitted in FIG. 1. Herein, a memory 115 may have stored various instructions to be described later, and the processor 120 may execute the instructions stored in the memory 115 and may perform processes of the present disclosure by executing the instructions to be disclosed later. Such description of the service server 100 does not exclude an integrated device including any combination of a processor, a memory, a medium, or any other computing components.

Herein, said units, i.e., the sensor data collection unit 130, the data transmission unit 140, the vehicle management unit 150, the data processing server management unit 160, the result transmission unit 170, the result receiving unit 180 and the server ranking unit 190, may be based on individual hardware units interworking with the service server 100 and/or software installed on the service server 100, but a scope of the present disclosure may not be limited thereto.

Such service server 100 may interwork with a subject vehicle 200. A configuration of the subject vehicle 200 may be explained below by referring to FIG. 2.

Figure 2:
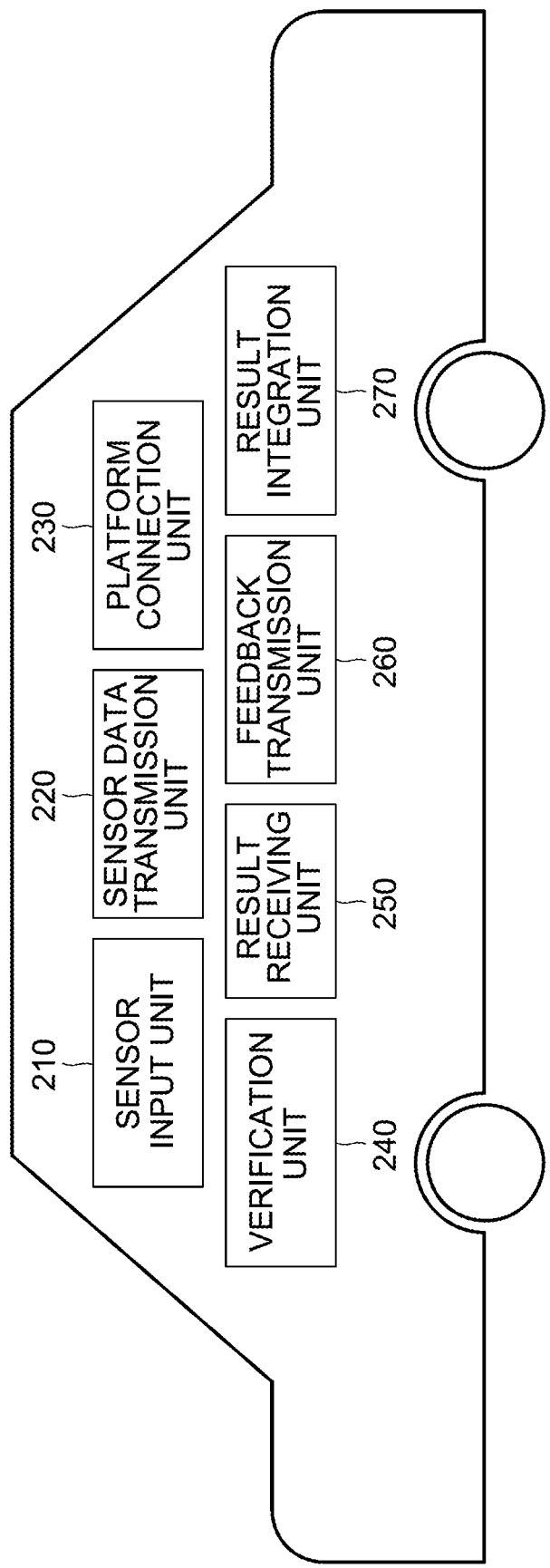
FIG. 2 is a drawing schematically illustrating a configuration of a subject vehicle interworking with the service server for providing the autonomous driving service platform to be used for supporting the autonomous driving of the autonomous vehicles by using the competitive computing and the information fusion in accordance with one example embodiment of the present disclosure.

FIG. 2 is a drawing schematically illustrating the configuration of the subject vehicle interworking with the service server for providing the autonomous driving service platform to be used for supporting the autonomous driving of the autonomous vehicles by using the competitive computing and the information fusion in accordance with one example embodiment of the present disclosure.

By referring to FIG. 2, the subject vehicle 200 may include a sensor input unit 210, a sensor data transmission unit 220, a platform connection unit 230, a verification unit 240, a result receiving unit 250, a feedback transmission unit 260 and a result integration unit 270. The subject vehicle 200 may be one of the autonomous vehicles which performs an autonomous driving by using the service server 100. Specifically, the autonomous vehicles may perform the autonomous driving by using autonomous driving source information acquired from multiple data processing servers which include autonomous driving algorithms to be explained later, while using the service server 100 as a middle manager. However, the service server 100 may not only perform a simple managing processes, but also perform processes for the competitive computing and the information fusion. Such processes will be explained by referring to FIG. 3.

Herein, said units, i.e., the sensor input unit 210, the sensor data transmission unit 220, the platform connection unit 230, the verification unit 240, the result receiving unit 250, the feedback transmission unit 260 and the result integration unit 270, may be based on individual hardware units interworking with the subject vehicle 200 and/or software installed on the subject vehicle 200, but a scope of the present disclosure may not be limited thereto.

Figure 3:
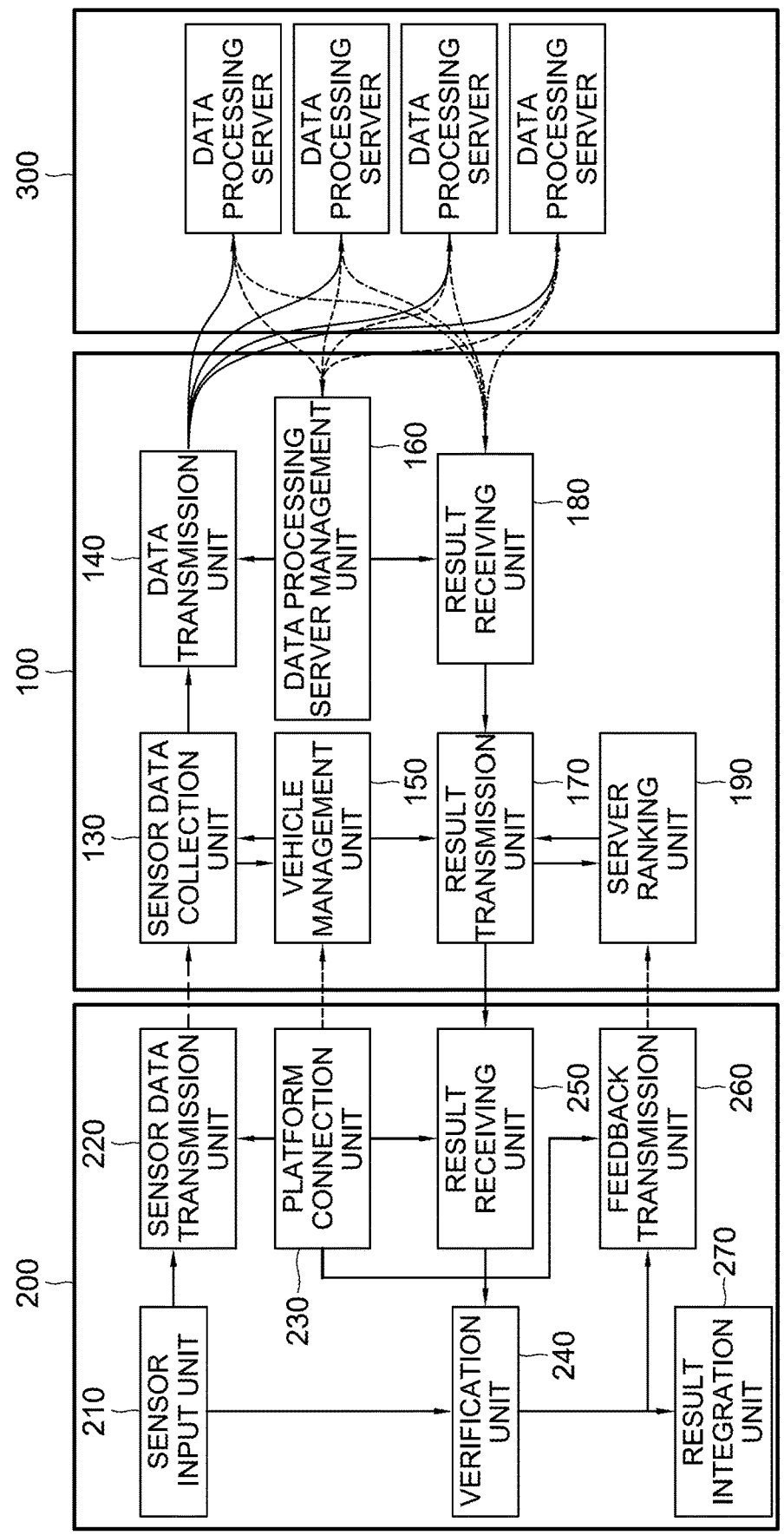
FIG. 3 is a drawing schematically illustrating correlations among the subject vehicle, the data processing servers and the service server for providing the autonomous driving service platform to be used for supporting the autonomous driving of the autonomous vehicles by using the competitive computing and the information fusion in accordance with one example embodiment of the present disclosure.

FIG. 3 is a drawing schematically illustrating correlations among the subject vehicle, the data processing servers and the service server for providing the autonomous driving service platform to be used for supporting the autonomous driving of the autonomous vehicles by using the competitive computing and the information fusion in accordance with one example embodiment of the present disclosure.

By referring to FIG. 3, correlations among units included in the subject vehicle 200 which acquires the autonomous driving source information from the data processing servers 300 through the service server 100 may be seen. Below, each of functions of each of configurations may be explained along with the method for providing the autonomous driving service platform, by referring to FIG. 3.

First, the service server 100 may continuously acquire individual sensor data and individual driving data from the autonomous vehicles. Herein, the individual sensor data, including information on surroundings of the autonomous vehicles, may be acquired through sensors installed on each of the autonomous vehicles. By referring to FIG. 3, it can be seen that the subject vehicle 200, one of said autonomous vehicles, delivers subject sensor data acquired through the sensor input unit 210 to the sensor data collection unit 130 through the sensor data transmission unit 220. As the autonomous vehicles perform processes similar to those shown above, the service server 100 may acquire the individual sensor data of the autonomous vehicles.

The individual driving data may include information on each of locations and each of velocities of the autonomous vehicles. Additionally, the individual driving data may include at least part of topographic information around the autonomous vehicles, climate information therearound, driving timing information of the autonomous vehicles, and vehicle type information thereof. In such circumstance, the service server 100 may support the subject vehicle 200 to perform the autonomous driving by using the autonomous driving source information. As a first step, the service server 100 may select specific autonomous vehicles, among the autonomous vehicles, which are related to the subject vehicle 200.

Specifically, the service server 100 may select the specific autonomous vehicles, among the autonomous vehicles, which satisfy at least one of a direct interaction condition corresponding to a relationship between a subject location of the subject vehicle and one or more individual locations of the autonomous vehicles and an indirect interaction condition corresponding to individual motion information of the autonomous vehicles. According to the direct interaction condition, the specific autonomous vehicles may be selected by finding ones whose differences between the individual locations and the subject location are smaller than a first threshold. Also, according to the indirect interaction condition, the specific autonomous vehicles may be selected by finding ones whose differences between the individual locations and the subject location are expected, by referring to the individual motion information including information on the velocities thereof, to become smaller than the first threshold after a certain time, although the differences are larger than or same as the first threshold.

Thereafter, the service server 100 may deliver specific sensor data of the specific autonomous vehicles to the data processing servers 300 through the data transmission unit 140. Herein, the data processing servers 300 may include autonomous driving algorithms built by using at least part of a rule-based algorithm and a deep learning algorithm, to become capable of generating the autonomous driving source information by using the autonomous driving algorithms. Also, each of the data processing servers 300 may be operated by each of different entities, e.g., different IT companies. In this case, their autonomous driving algorithms are different from each other, and may compete with each other. Such competition may be explained soon after.

As one example, each of one or more specific data processing servers, among the data processing servers 300, using each of one or more specific autonomous driving algorithms built by using the deep learning algorithm may apply a convolutional operation using its own convolutional layer to the subject sensor data and the specific sensor data to generate at least one feature map, and may apply an output operation using its own output layer to the feature map, to thereby generate each of the pieces of the autonomous driving source information.

Herein, the autonomous driving source information may include information on locations of objects located around the subject vehicle 200 and the specific autonomous vehicles, but a scope of the present disclosure may not be limited thereto. In this case, the output layer may include a pooling layer and a Fully-Connected (FC) layer to detect said locations thereof. After each of the pieces of the autonomous driving source information is acquired from each of the data processing servers 300 through the result receiving unit 180, the service server 100 may transmit the autonomous driving source information to the subject vehicle 200 through the result transmission unit 170. Herein, additional information, i.e., circumstance-specific performance information to be explained below, acquired through the server ranking unit 190, may be transmitted to the subject vehicle along with the autonomous driving source information.

That is, the service server 100 may acquire circumstance-specific performance information on the data processing servers 300 from a circumstance-specific performance DB in the server ranking unit 190 by referring to subject driving data of the subject vehicle 200. Specifically, the service server 100 may acquire at least part of topographic information around the subject vehicle 200, climate information therearound, driving timing information of the subject vehicle 200, and the vehicle type information thereof by referring to the subject driving data of the subject vehicle 200, and may transmit a query to the circumstance-specific performance DB by referring to said at least part of the topographic information, the climate information, the driving timing information and the vehicle type information, to thereby acquire the circumstance-specific performance information of the data processing servers 300. Herein, the circumstance-specific performance DB may include information on rankings of the data processing servers 300 in each of circumstances, and the circumstance-specific performance information may include information on rankings of the data processing servers 300 in a specific circumstance corresponding to the subject driving data.

After the circumstance-specific performance information is acquired as shown above, the service server 100 may deliver the autonomous driving source information and the circumstance-specific performance information to the subject vehicle 200 through the result transmission unit 170. The subject vehicle 200 may acquire the autonomous driving source information and the circumstance-specific performance information through the result receiving unit 250, and may deliver those to the verification unit 240.

Thereafter, the subject vehicle 200 may instruct the verification unit 240 to calculate each of self-verification scores on each of the pieces of the autonomous driving source information by referring to the subject sensor data. Specifically, the service server 100 may instruct at least one Convolutional Neural Network (CNN) included in the subject vehicle 200 to apply at least one CNN operation to a vector including (i) the subject sensor data and (ii) the autonomous driving source information to perform a classification, to thereby generate the self-verification scores. Herein, the CNN may include a convolutional layer and an output layer.

Then, the subject vehicle 200 may instruct the result integration unit 270 to generate integrated autonomous driving source information corresponding to each of the pieces of the autonomous driving source information by referring to at least part of the self-verification scores and the circumstance-specific performance information. Specifically, in case two different pieces of the autonomous driving source information denote different detection results on a same object, e.g., in case of a class of the same object detected as differently in the two pieces of the autonomous driving source information, one piece of the autonomous driving source information whose corresponding self-verification score is larger or whose circumstance-specific rank is higher than the others, may be determined as correct, and may be reflected on the integrated autonomous driving source information.

Thereafter, the subject vehicle 200 may become capable of performing the autonomous driving by referring to the integrated autonomous driving source information. Also, in parallel, the subject vehicle 200 may deliver the self-verification scores to the service server 100 as performance feedback information through the feedback transmission unit 260. Then, the service server 100 may update the circumstance-specific performance DB by referring to the performance feedback information. By such updating process, the circumstance-specific performance DB may be built to include information on rankings of the data processing servers 300 in each of circumstances.

Different from above-explained embodiment, there is an additional embodiment for generating the integrated autonomous driving source information and the self-verification scores. Hereinafter, the additional embodiment will be explained.

That is, the subject vehicle 200 may perform the autonomous driving by referring to the integrated autonomous driving source information generated by using each of the pieces of the autonomous driving source information and the circumstance-specific performance information at a T-th timing, and may calculate each of the self-verification scores on each of the pieces of the autonomous driving source information by using resultant circumstance information at a (T+1)-th timing, which is later than the T-th timing, corresponding to a circumstance caused by the autonomous driving performed at the T-th timing. To be simple, the subject vehicle 200 may just perform the autonomous driving by using the integrated autonomous driving source information based on the circumstance-specific performance information, may detect whether a negative circumstance, e.g., a sudden stop, a car horning or an accident, occurred or not, and may calculate at least part of the self-verification scores corresponding to at least part of the integrated autonomous driving source information which has been a basis of the autonomous driving of the T-th timing, to be smaller. By delivering such self-verification scores to the service server 100, the circumstance-specific performance DB may be updated.

Said service server 100 and the subject vehicle 200 may include some configurations for maintaining their connections. For example, the service server 100 may be connected with the autonomous vehicles including the subject vehicle 200 through the vehicle management unit 150, and may be connected with the data processing servers 300 through the data processing server management unit 160. The subject vehicle 200 may be connected with the service server 100 through the platform connection unit 230.

By providing the autonomous driving service platform, i.e., the service server 100, a safer autonomous driving using the competitive computing and the information fusion may be acquired.

It is an effect of the present disclosure to improve an accuracy and a stability of at least one autonomous driving algorithm.

It is another effect of the present disclosure to allow at least one autonomous vehicle to perform autonomous driving according to autonomous driving source information with a sufficient credibility.

It is still another effect of the present disclosure to allow safe autonomous driving by using nearby sensor data of one or more nearby autonomous vehicles.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for providing an autonomous driving service platform to be used for supporting an autonomous driving of autonomous vehicles by using a competitive computing and information fusion, comprising steps of:
   (a) a service server acquiring sensor data and driving data from at least some of the autonomous vehicles including a subject vehicle via sensors installed respectively thereon;
   (b) the service server performing (i) a process of acquiring each of pieces of autonomous driving source information for the subject vehicle by inputting sensor data of one or more specific autonomous vehicles among the autonomous vehicles other than the subject vehicle and subject sensor data of the subject vehicle to each of one or more data processing servers and (ii) a process of acquiring circumstance-specific performance information on the data processing servers from a circumstance-specific performance DB by referring to subject driving data of the subject vehicle; and
   (c) the service server transmitting the autonomous driving source information and the circumstance-specific performance information to the subject vehicle, and controlling the subject vehicle to perform the autonomous driving by referring to the autonomous driving source information and the circumstance-specific performance information.

2. The method of claim 1, wherein, at the step of (b), the service server acquires at least part of topographic information around the subject vehicle, climate information therearound, driving timing information of the subject vehicle, and vehicle type information thereof by referring to the subject driving data, and transmits a query to the circumstance-specific performance DB by referring to said at least part of the topographic information, the climate information, the driving timing information and the vehicle type information, to thereby acquire the circumstance-specific performance information of the data processing servers.

3. The method of claim 1, wherein, at the step of (c), the service server instructs the subject vehicle (i) to calculate each of self-verification scores on each of the pieces of the autonomous driving source information by referring to the subject sensor data, (ii) to generate integrated autonomous driving source information corresponding to each of the pieces of the autonomous driving source information by referring to at least part of the self-verification scores and the circumstance-specific performance information, (iii) to perform the autonomous driving by referring to the integrated autonomous driving source information.

4. The method of claim 3, wherein the service server instructs at least one Convolutional Neural Network (CNN) included in the subject vehicle to apply at least one CNN operation to a vector including (i) the subject sensor data and (ii) the autonomous driving source information to perform a classification, to thereby generate the self-verification scores.

5. The method of claim 3, wherein the service server instructs the subject vehicle to deliver the self-verification scores to the service server as performance feedback information, and updates the circumstance-specific performance DB by referring to the performance feedback information.

6. The method of claim 1, wherein the service server instructs the subject vehicle (i) to perform the autonomous driving by referring to integrated autonomous driving source information generated by using each of the pieces of the autonomous driving source information and the circumstance-specific performance information at a T-th timing, (ii) to calculate each of self-verification scores on each of the pieces of the autonomous driving source information by using resultant circumstance information at a (T+1)-th timing according to the autonomous driving performed at the T-th timing, and (iii) to deliver the self-verification scores to the service server as performance feedback information.

7. The method of claim 1, wherein, at the step of (b), the service server selects the specific autonomous vehicles, among the autonomous vehicles, which satisfy at least one of a direct interaction condition corresponding to a relationship between a subject location of the subject vehicle and one or more individual locations of the autonomous vehicles and an indirect interaction condition corresponding to individual motion information of the autonomous vehicles.

8. The method of claim 1, wherein each of the data processing servers generates each of the pieces of the autonomous driving source information by applying its autonomous driving algorithms to the subject sensor data and the sensor data from the specific autonomous vehicles,
   wherein the autonomous driving algorithms are built by using at least part of a rule based algorithm and a deep learning algorithm, and each of the data processing servers is operated by each of different entities so that their autonomous driving algorithms are different from each other.

9. The method of claim 8, wherein each of one or more specific data processing servers using each of one or more specific autonomous driving algorithms built based on the deep learning algorithm applies a convolutional operation using its own convolutional layer to the subject sensor data and the sensor data from the specific autonomous vehicles to generate at least one feature map, and applies an output operation using its own output layer to the feature map, to thereby generate each of the pieces of the autonomous driving source information.

10. A service server for providing an autonomous driving service platform to be used for supporting an autonomous driving of autonomous vehicles by using a competitive computing and information fusion, comprising:
   at least one memory that stores instructions; and
   at least one processor configured to execute the instructions to perform processes of: (I) acquiring sensor data and driving data from at least some of the autonomous vehicles including a subject vehicle via sensors installed respectively thereon; (II) (i) acquiring each of pieces of autonomous driving source information for the subject vehicle by inputting sensor data of one or more specific autonomous vehicles among the autonomous vehicles other than the subject vehicle and subject sensor data of the subject vehicle to each of one or more data processing servers and (ii) acquiring circumstance-specific performance information on the data processing servers from a circumstance-specific performance DB by referring to subject driving data of the subject vehicle; and (III) transmitting the autonomous driving source information and the circumstance-specific performance information to the subject vehicle, and controlling the subject vehicle to perform the autonomous driving by referring to the autonomous driving source information and the circumstance-specific performance information.

11. The service server of claim 10, wherein, at the process of (II), the processor acquires at least part of topographic information around the subject vehicle, climate information therearound, driving timing information of the subject vehicle, and vehicle type information thereof by referring to the subject driving data, and transmits a query to the circumstance-specific performance DB by referring to said at least part of the topographic information, the climate information, the driving timing information and the vehicle type information, to thereby acquire the circumstance-specific performance information of the data processing servers.

12. The service server of claim 10, wherein, at the process of (III), the processor instructs the subject vehicle (i) to calculate each of self-verification scores on each of the pieces of the autonomous driving source information by referring to the subject sensor data, (ii) to generate integrated autonomous driving source information corresponding to each of the pieces of the autonomous driving source information by referring to at least part of the self verification scores and the circumstance-specific performance information, (iii) to perform the autonomous driving by referring to the integrated autonomous driving source information.

13. The service server of claim 12, wherein the processor instructs at least one Convolutional Neural Network (CNN) included in the subject vehicle to apply at least one CNN operation to a vector including (i) the subject sensor data and (ii) the autonomous driving source information to perform a classification, to thereby generate the self-verification scores.

14. The service server of claim 12, wherein the processor instructs the subject vehicle to deliver the self-verification scores to the service server as performance feedback information, and updates the circumstance-specific performance DB by referring to the performance feedback information.

15. The service server of claim 10, wherein the processor instructs the subject vehicle (i) to perform the autonomous driving by referring to integrated autonomous driving source information generated by using each of the pieces of the autonomous driving source information and the circumstance-specific performance information at a T-th timing, (ii) to calculate each of self-verification scores on each of the pieces of the autonomous driving source information by using resultant circumstance information at a (T+1)-th timing according to the autonomous driving performed at the T-th timing, and (iii) to deliver the self-verification scores to the service server as performance feedback information.

16. The service server of claim 10, wherein, at the process of (II), the processor selects the specific autonomous vehicles, among the autonomous vehicles, which satisfy at least one of a direct interaction condition corresponding to a relationship between a subject location of the subject vehicle and one or more individual locations of the autonomous vehicles and an indirect interaction condition corresponding to individual motion information of the autonomous vehicles.

17. The service server of claim 10, wherein each of the data processing servers generates each of the pieces of the autonomous driving source information by applying its autonomous driving algorithms to the subject sensor data and the sensor data from the specific autonomous vehicles,
wherein the autonomous driving algorithms are built by using at least part of a rule based algorithm and a deep learning algorithm, and each of the data processing servers are operated by each of different entities so that their autonomous driving algorithms are different from each other.

18. The service server of claim 17, wherein each of one or more specific data processing servers using each of one or more specific autonomous driving algorithms built based on the deep learning algorithm applies a convolutional operation using its own convolutional layer to the subject sensor data and the sensor data from the specific autonomous vehicles to generate at least one feature map, and applies an output operation using its own output layer to the feature map, to thereby generate each of the pieces of the autonomous driving source information.

* * * * *